United States Patent [19]

Woodward

[11] 4,096,807

[45] Jun. 27, 1978

[54] RESTRAINT SHIELD

[76] Inventor: Ernest F. Woodward, 9950 A Royal Oak Ct., Sun City, Ariz. 85351

[21] Appl. No.: 735,400

[22] Filed: Oct. 26, 1976

[51] Int. Cl.² .......................................... B61D 45/00
[52] U.S. Cl. .................................. 105/467; 24/115 L; 52/222; 244/118 R; 279/22; 105/376
[58] Field of Search ................... 254/135 R; 105/376, 105/466, 467; 280/179 R, 179 A; 296/34, 24 R, 24 C; 294/82 R, 26; 214/10.5 R; 52/222, 64; 244/118 R, 137 R; 279/22, 30; 24/115 L, 136 A, 244, 263 DP, 155 BR

[56] References Cited

U.S. PATENT DOCUMENTS

| | | | |
|---|---|---|---|
| 276,053 | 4/1883 | Lewis | 105/376 |
| 1,675,249 | 6/1928 | Carver | 273/29 BD |
| 1,939,841 | 12/1933 | Briggs | 38/102 |
| 2,075,711 | 3/1937 | Gilley | 280/179 A X |
| 2,605,064 | 7/1952 | Davis | 105/467 X |
| 2,623,760 | 12/1952 | Fornelius | 280/179 A |
| 2,669,402 | 2/1954 | Del Mar | 244/121 |
| 3,099,313 | 7/1963 | Peck et al. | 242/75 |
| 3,103,893 | 9/1963 | Clark et al. | 105/467 |
| 3,163,903 | 1/1965 | Knoebe | 403/34 |
| 3,206,167 | 9/1965 | Armington | 254/51 |
| 3,280,760 | 10/1966 | Woods et al. | 105/376 |
| 3,324,595 | 6/1967 | Loomis | 105/376 X |
| 3,337,256 | 8/1967 | Shropshire, Jr. | 294/82 R |
| 3,486,723 | 12/1969 | Harrison | 105/467 |
| 3,582,124 | 6/1971 | Quirk, Jr. | 294/26 |
| 3,671,014 | 6/1972 | Karlsson | 254/51 |
| 3,685,799 | 8/1972 | Wriedt et al. | 254/51 |
| 3,897,919 | 8/1975 | Weingarten | 244/118 R |

FOREIGN PATENT DOCUMENTS

| | | | |
|---|---|---|---|
| 647,107 | 8/1962 | Canada | 105/376 |
| 668,050 | 8/1963 | Canada | 105/467 |
| 464,428 | 4/1950 | Canada | 24/115 L |
| 196,185 | 2/1958 | Germany | 24/115 L |

Primary Examiner—Drayton E. Hoffman
Assistant Examiner—Donald W. Underwood
Attorney, Agent, or Firm—Woodard, Weikart, Emhardt & Naughton

[57] ABSTRACT

A cargo control restraint shield for use in the container of a trailer truck for weather protection of the cargo, compartmentalization of the cargo and for restraining the cargo and holding it in place. Cables are secured within the container at the upper and lower corners thereof so as to extend from the rear to the front of the container in a taut fashion. Clamps are received on the cables and are movable thereon from front to rear of the container. A flexible rectangular sheet of vinyl material has hooks mounted at the four corners thereof. Two of the hooks are secured to the clamps and two are secured to the lower cables. The clamps lock on the cables against movement of the vinyl sheet away from the cargo but may be released by long levers which hang downwardly from the cables. Long handles are attached to the hooks which are secured to the clamps and may be used to lift the hooks off of the clamps or to place the hooks on the clamps. The vinyl sheet may have extensions on the sides thereof which also have hooks for mounting on the clamps and cables. Alternative embodiments include a pair of overlying hooks instead of a single hook and a restraint shield which extends around a corner from a transverse to a longitudinal position relative to the container.

3 Claims, 14 Drawing Figures

RESTRAINT SHIELD

BACKGROUND OF THE INVENTION

1. Field of the Invention

This invention relates to a cargo control restraint shield for use in trailer trucks and the like.

2. Description of the Prior Art

The following listed U.S. patents are examples of the prior art in this field:
- 2,669,402 - Del Mar
- 3,099,313 - Peck
- 3,103,898 - Clark
- 3,486,723 - Harrison
- 3,897,919 - Weingarten
- 2,623,760 - Fornelius
- 3,163,903 - Knaebe
- 3,206,167 - Armington
- 3,671,014 - Karlsson
- 3,685,799 - Weiedt
- 1,675,249 - Carver
- 1,939,841 - Briggs One of the problems involved in the loading, transporting and unloading of cargo in trailer trucks relates to the shifting of the cargo during transit. Such cargo shifting frequently causes damage to the cargo and in some cases makes difficult the opening of the doors of the trailer. On occasion, it will become necessary to use a fork lift truck to open the door of the trailer or even to use a blow torch to cut open the door in order to get into the trailer to see what is holding the door closed.

In some situations, truckers have elected to use a plastic sheet or cover thrown over the rear of the cargo when in its stacked condition. The purpose for this cover is not only to contain the cargo and to prevent movement of it but also to prevent water from coming in contact with the cargo. It has been found that such plastic covers do not satisfactorily accomplish the jobs for which they are intended. They are usually used only once and then thrown away and they are not effective in preventing the cargo from shifting.

SUMMARY OF THE INVENTION

One embodiment of the present invention might include a cargo control restraint shield for use in a vehicle container. The shield includes a flexible sheet which has hooks mounted thereon. A pair of cables is secured at opposite end portions thereof to the vehicle within the container so as to provide a pair of taut lengths of cable. The hooks are mounted onto the cables for hanging the flexible sheet in place. There may also be provided clamping means for holding the hooks and sheet in place.

Objects of the invention are to provide an improved device for restraining cargo from movement in the container of a trailer truck or other vehicle, to provide improved means for protecting the cargo in the container and to provide improved means for compartmentalizing cargo.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
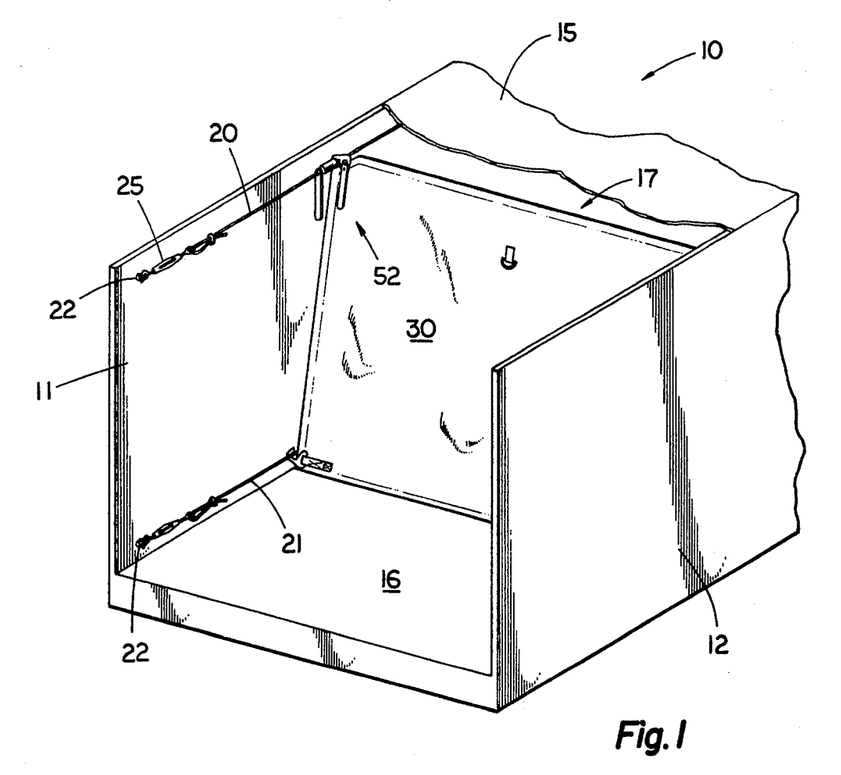
FIG. 1 is a perspective view of a container for a truck showing a portion of the container broken away and showing the cargo control restraint shield of the present invention mounted in the container.

Referring more particularly to FIG. 1 there is illustrated a container 10 of a trailer truck which includes side walls 11 and 12, a top wall 15 and a bed 16. The cargo control restraining shield 17 is shown as being mounted on cables 20 and 21. There are two cables 20, each located in an upper corner of the container and two of the cables 21, each located in a lower corner of the container, only one of each of the cables 20 and 21 being shown in FIG. 1. Cables 20 and 21 are secured to eye-bolts 22 which are in turn mounted on the container 10 but nuts 14 and suitable lock washers.

Figure 2:
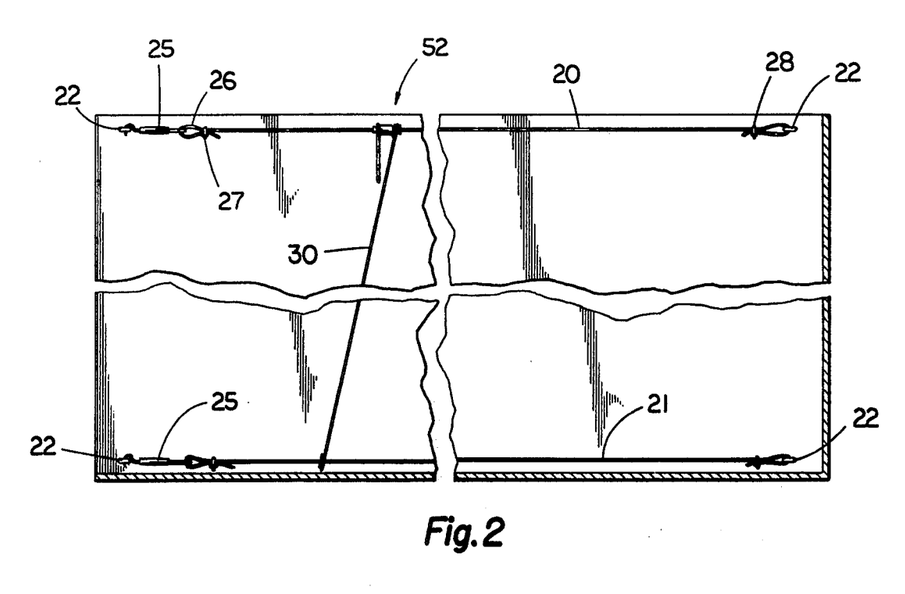
FIG. 2 is a vertical section taken through the container of FIG. 1.

It is important that the cables 20 and 21 be relatively taut. This is accomplished by means of turnbuckles 25 which can be tightened from time to time. Each turnbuckle 25 may attached directly at one end of one of the eye-bolts as shown in FIG. 2 and may be connected at the other end to a loop 26 at the end of the respective cables 20 and 21 which loop is formed by a U-bolt 27 gripping the end of the cable and holding it in place. A similar U-bolt 28 is used at the opposite end portion of the cable 20 to secure the cable to the respective eye-bolt 22.

One purpose of the present restraint shield is to hold light and medium cargo generally in its orginal loaded position, and to prevent it from falling freely onto the trailer floor damaging the cargo and its contents. The shield 17 consists of a flexible sheet or net 30 which may be formed from a single piece of heavy vinyl material. In one specific embodiment of the invention, the vinyl material had a dimension of approximately 90 inches by 90 inches and a double or triple hem 29 sewn along its four edge portions providing strength for pulling against the borders of the sheet when pressure is applied against any portion of the surface. Furthermore, the strongly sewn hem provides sufficient material at 31, 32, 35, and 36 of the rectangular sheet to mount hooks 37 and 40 to hold the sheet or net suspended on the cables 20 and mounted on cables 21.

It will be noted that the upper corners 41 and 42 of the net or sheet 30 are cut off at a 45° angle and that the hooks 37 are mounted inwardly from the extension of the upper edge 45 and the side edges 46 so that securing of the hooks 37 to the cables 20 causes the relatively heavy flexible sheet 30 to be held up against the top wall 15 of the container and against the sides 11 and 12 of the container when the hooks are secured to the cables 20. In similar fashion, the hooks 40 at the lower corners 35 and 36 of the net or sheet 30 are spaced slightly inwardly of the side edges 46 and are spaced above, approximately 6 inches or so in one specific embodiment, the lower edge 47 of the sheet 30 so that the attaching of the hooks 40 to the cables 21 draws the side edges 46 and the lower edge 47 of the sheet 30 against the sides 11 and 12 and the bottom or bed 16 of the container. In order to provide additional strength and stiffness to the shield, webbing 48 is sewn to the sheet 30 and extends across the center of the sheet 30 from one side edge 46 to the other. The webbing causes the sheet to engage the side of the container when hooked in position.

Figure 4:
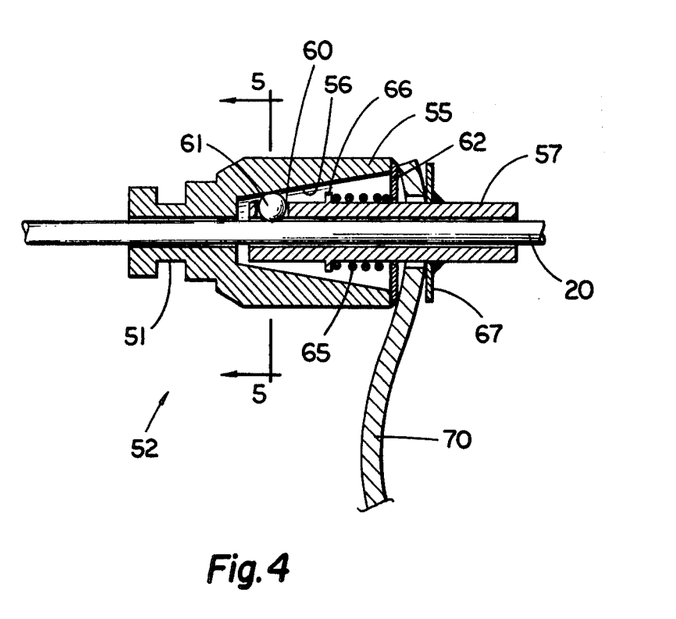
FIG. 4 is an enlarged axial section through a clamp forming a part of the structure illustrated in FIGS. 1 and 2.
Figure 5A:
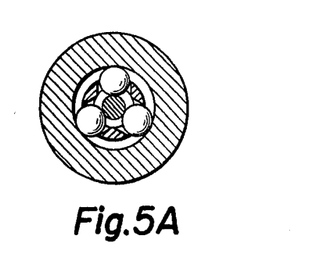
FIGS. 5A and 5B are cross sections taken along the line 5—5 of FIG. 4 in the direction of the arrows and showing the clamp in two different operating positions.
Figure 5B:
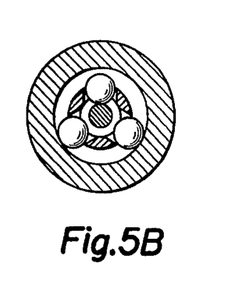

Each of the hooks 37 has secured thereto an elongated handle 50 which facilitates the user of the present device reaching the handle so as to lift the hooks 37 off of or so as to place them upon the annular grooves 51 of clamps or locking devices 52. The hooks 37 and handles 50 are secured to the net 30 by bolts 53 and sheet metal member 54. Each of the cargo restraint shields has a pair of the clamps or locking devices 52 associated therewith. FIGS. 4, 5A and 5B show in detail a representative one of the clamping devices 52 as including a housing 55 having a frusto-conical interior 56. The housing 55 has an annular configuration and has the annular groove 51 formed therein so as to face radially outwardly therefrom. Received within the housing 55 is a ball guide 57 which has radially outwardly extending openings 60 therein which receive balls 61. The balls 61 work between a cable 20 and the frusto-conical inwardly facing surface 56 of the annular housing 55.

Figure 7:
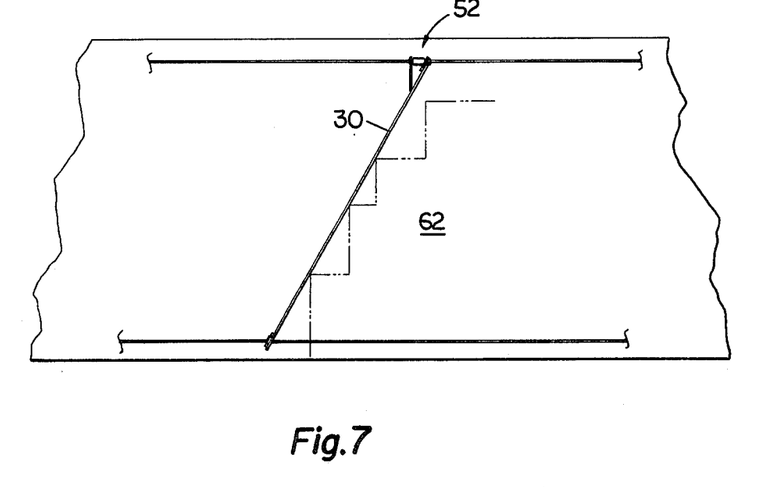
FIG. 7 is a somewhat schematic view similar to FIG. 2 showing the relationship of the load or cargo in the container to the restraint shield.
Figure 8:
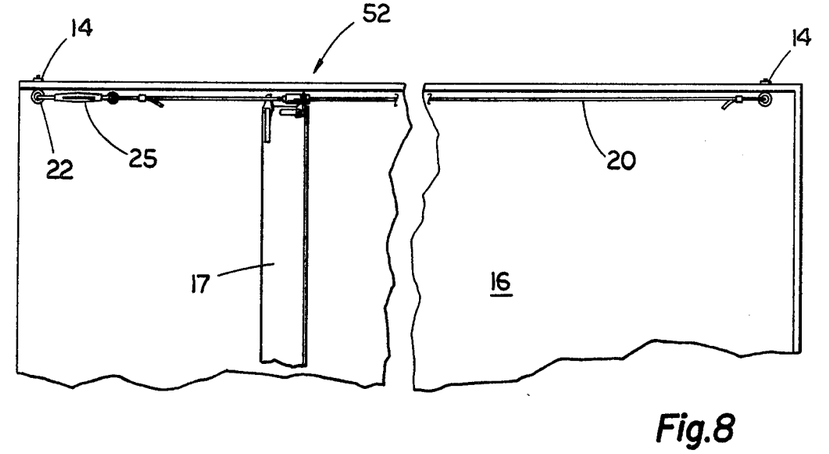
FIG. 8 is a top plan view of the truck container bed of FIG. 1.

Referring to FIGS. 2 and 7, the clamp 52 is positioned so that the load is to the right of the clamp and the end of the clamp having the annular groove 51 is positioned toward the load. Thus, the load 62 in FIG. 7 is positioned to the right of the sheet or net 30 and, of course, the clamp 52 is reversed in comparison to FIG. 4 with the annular groove 51 on the right as viewed in FIG. 7. As viewed in FIG. 4, the clamp normally resists movement in a rightward direction but is easily movable in a leftward direction. This function is accomplished by the balls 61 becoming locked between the frusto-conical surface 56 and the cable 20 when an effort is made to move the clamping device 52 rightwardly relative to the cable 20. On the other hand, when an effort is made to move the clamping device 52 leftwardly on the cable 20, the cable 20 tends to pull the ball rightwardly away from the frusto-conical surface freeing up the locking action between the ball and the cable and permitting the clamping device 52 to move leftwardly relative to the cable.

The housing 55 includes a welded-on cover 62 against which acts a coiled compression spring 65. The coiled compression spring acts between the raised annular projection 66 on the ball guide 57 and the cover 62. The ball guide 57 has fixed thereto an outwardly extending projection 67. Mounted between the projection 67 and the cover 62 and hanging from the ball guide is a lever 70 which has a relatively long downwardly hanging lever arm. This long lever arm permits the worker in the container to release the clamping action of the clamping device 52 even though the clamping device is seven to eight feet above the bed of the container. If the lower end of the lever 70 is pulled to the right as viewed in FIG. 4, ball guide 57 is also pulled rightwardly against the urging of the spring 65 thus freeing up the clamping action of the balls 61 on the cable 20 and permitting both rightward and leftward movement of the clamping device 52. FIG. 5A shows the locked position of the clamping device with the balls firmly received between the frusto-conical surface 56 and cable 20. FIG. 5B shows the unlocked position with the space between the cable and the frusto-conical surface being sufficiently great at the location of the balls to permit free movement of the cable relative to the clamping device 52.

Figure 6:
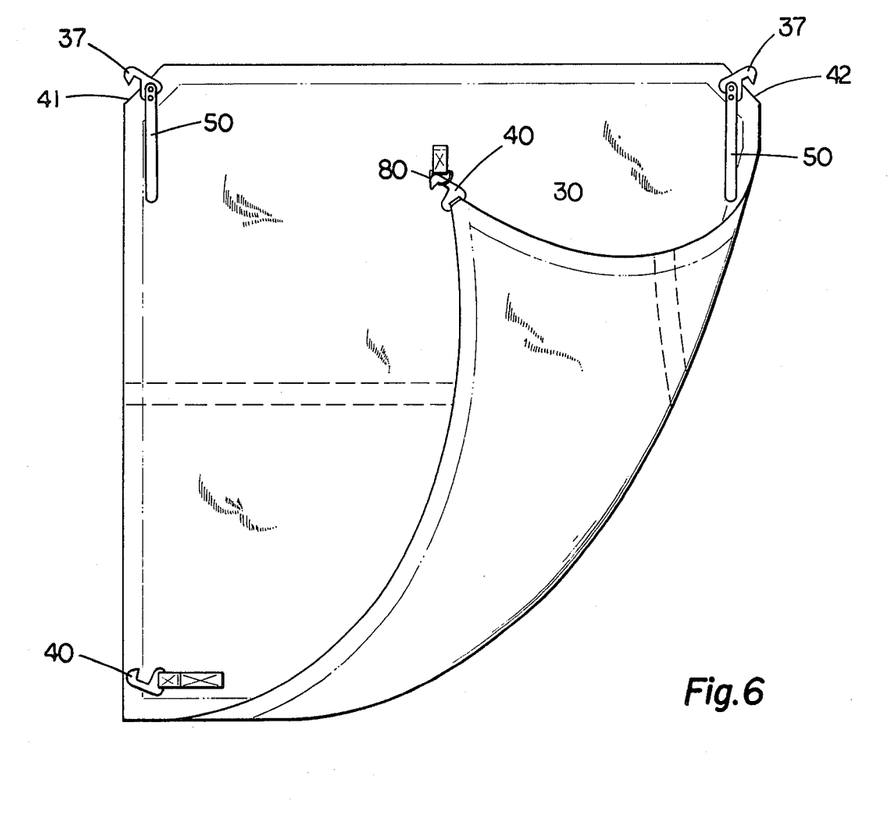
FIG. 6 is a view similar to FIG. 3 of the cargo control restraint shield of the present invention and showing it in a different operating position.

FIG. 6 shows an alternative position of the sheet 30 with one of the hooks 40 connected to a D-ring 80 sewn to the sheet 30. The use of the D-ring 80 permits the worker to move under the restraint guide for the removal of cargo in placing cargo behind sheet 30. Alternatively, the entire net or shield may be disconnected by disconnection of the hook 40 and the hook 37 on one side of the shield and permitting the restraint shield to hang downwardly from a single one of the cables 20 while loading or unloading is taking place. After the material being loaded into one specific portion of the container has been completely loaded, the restraint shield is mounted in place as shown in FIG. 7 by pushing the levers 70 of the clamping devices 52 up against the load with the restraint shield hooked upon the clamping devices by means of hooks 37 so that the restraint shield is laid out across the load 62 as shown in FIG. 7.

The lower end of the restraint shield is then secured in place by hooking the hooks 40 to the lower taut cables 21. If desired, additional restraint shields may be used after further groups of cargo have been loaded into the container. The last group of cargo is protected from rain coming into the doors of the container by means of the waterproof restraint shield. When it is desired to remove the restraint shield from its position as shown in FIG. 7 the worker pulls on the lever 70 releasing the gripping action of the balls and permitting the clamping device 52 to move leftwardly as viewed in FIG. 7 or FIG. 2. One or more of the various hooks 37 and 40 may then be disconnected and the restraint shield either completely removed or partially removed for unloading of the cargo.

Figure 9:
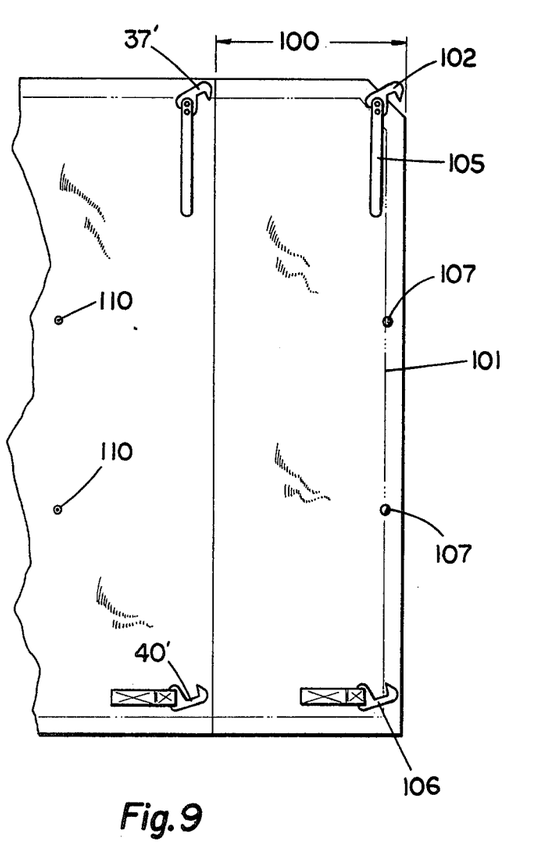
FIG. 9 is a front elevation similar to FIG. 3 of an alternative embodiment of the present invention.
Figure 10:
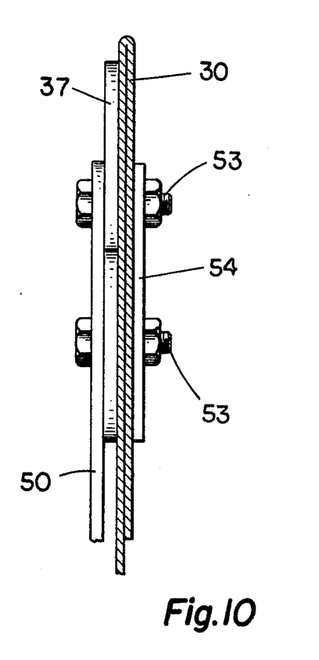
FIG. 10 is an enlarged side elevation of a portion of the structure shown in FIG. 3.

FIG. 9 shows an alternative embodiment of the invention which is identical to the above-described embodiment with the exception that on each side of the restraint shield there is sewn an extension 101 having a height of approximately the same as the basic height of the sheet 30 and having a width in one embodiment of approximately eighteen inches. That is, the dimension 100 is eighteen inches. Mounted on the extension 101 is a hook 102 having a handle 105 secured thereto and a further hook 106. Hooks 102 and 106 are supplemental to the standard hooks 37' and 40'. The alternative embodiment of FIG. 9 is particularly useful where the load is particularly irregular and it is necessary to have additional width in the restraint shield in order to mount it in position. When the extensions 101 are not in use, they may be snapped in an out-of-the-way position to the main body of the restraint shield by snaps 107 which connect to the mating snaps 110.

Figure 3:
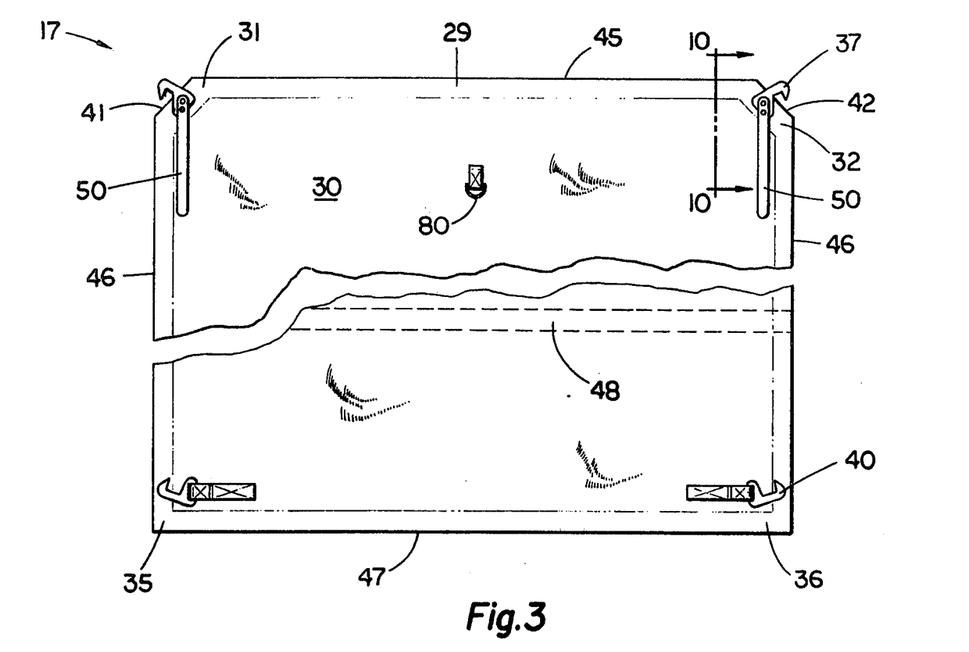
FIG. 3 is a front elevation of the restraint shield showing it in a dismounted condition from the vehicle container of FIGS. 1 and 2.
Figure 11:
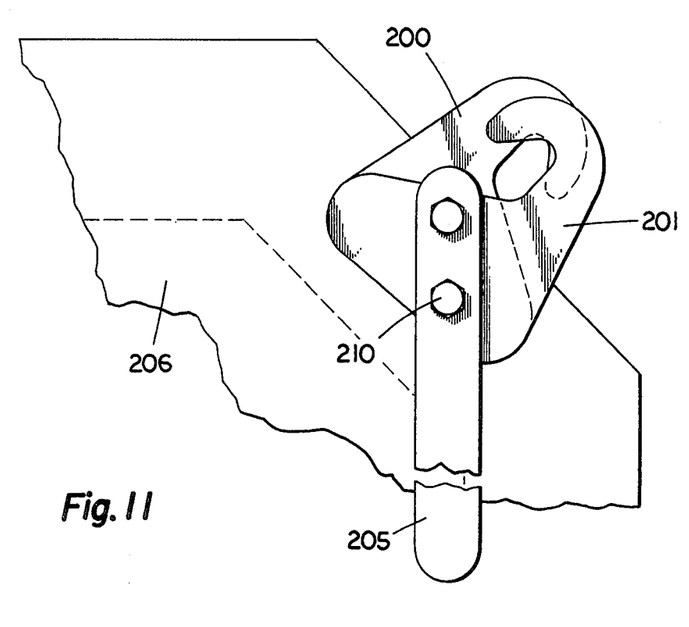
FIG. 11 is a fragmentary view similar to FIG. 3 showing an alternative form of the invention using two overlapping hooks instead of one hook.
Figure 11A:
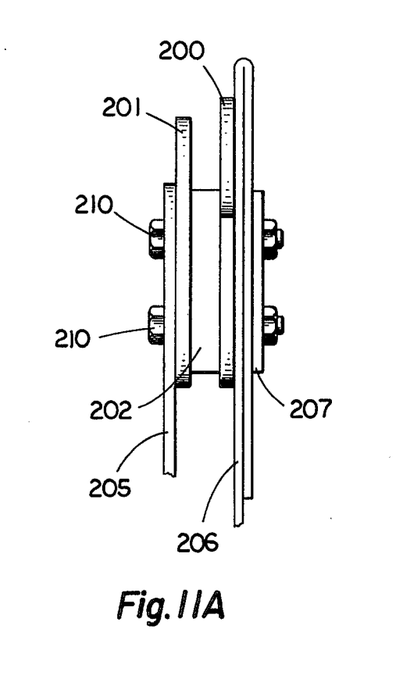
FIG. 11A is a side elevation of the structure of FIG. 11.

Referring to FIG. 11 there is illustrated an alternative embodiment of the invention which is identical to the structure shown in FIG. 3 except that the single hook 37 is replaced with a pair of overlapping reversed hooks 200 and 201. The hooks 200 and 201 are spaced apart by a spacer 202 which permits moving the cable 20 between the hooks. The two hooks 200 and 201 insure against the restraint shield coming off of the cable 20 accidentally at undesirable times. FIG. 11A shows the handle 205 (corresponding to handle 50) secured to hooks 201 and 200, spacer 202, flexible sheet 206, and sheet metal member 207 by bolts 210. It should be mentioned that only one of the hooks 201 is actually seated in slot 51 while the hook 200 merely hooks around the cable 20.

Figure 12:
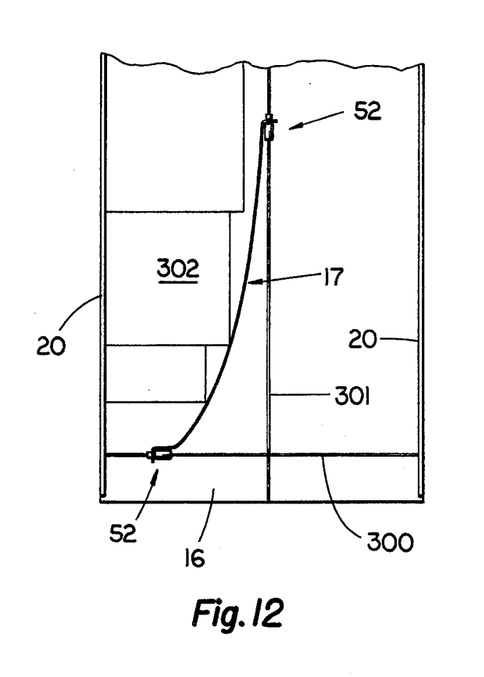
FIG. 12 is a top plan view similar to FIG. 8 of an alternative embodiment of the invention.

FIG. 12 is a somewhat schematic top plan view of an alternative embodiment of the invention wherein the taut cables 20 are supplemented by taut cables 300 and 301 which are secured to the top wall 15 so as to extend along the top wall adjacent thereto. The cables 300 and 301 have additional taut cables (not shown) directly under cables 300 and 301 and secured to the bed 16 of the container so as to extend along the bed adjacent thereto. The restraint shield 17 instead of being secured to cables 20 may be secured to locking devices 52 which are received on the taut cables 300 and 301. Thus, the restraint shield 17 in effect "turns the corner" as shown in FIG. 12 and functions to hold a load or cargo 302 in place on one side of the container. The hooks 40 at the bottom of the shield are hooked to either the taut cables 21 or to the taut cables (not shown) directly below the cables 300 and 301, depending on the location of the cargo 302.

It will be obvious from the above description that the present restraint shield provides means for weather protection of the cargo. This is accomplished by covering the rearmost portions of the cargo with the waterproof restraint shield. The restraint shield of the present invention also holds relatively light and medium weight crgo in place and prevents it from falling to the floor and becoming damaged. Furthermore, the restraint shield of the present invention facilitates compartmentalization of the cargo so that during loading and unloading there is no confusing and mixing of one portion of the cargo with another portion thereof.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, multiple restraint shields 17 may be used for a single container 10.

The invention is claimed is:

1. A cargo control restraint shield for use in a vehicle container which comprises:
   a flexible sheet;
   a pair of cables secured at opposite end portions thereof to said vehicle within said container so as to provide a pair of taut lengths of cable;
   a pair of clamps each received upon and slidable on a respective one of said cables, said clamps each including locking means which blocks movement of the clamp in one direction on its cable but permits movement in the opposite direction;
   hooks mounted on said flexible sheet, said hooks each being attachable to a respective one of said clamps, said vehicle container being adapted to receive cargo, said clamps being arranged so that said locking means blocks movement of said flexible sheet away from said cargo;
   said hooks being detachable from said clamps and connectable to said cables for hanging said flexible sheet out of the way;
   said flexible sheet being formed of waterproof material for protection of the cargo within said container, said sheet incorporating stiffening material extending horizontally from one side of said sheet to the other for causing said sheet to engage the sides of said container, said sheet having a generally rectangular configuration with the upper corners thereof cut off at approximately a 45° angle, said hooks being mounted on said flexible sheet at said cut off corner areas with the hooks in board of the rectangular sides of said sheet.

2. A cargo control restraint shield for use in a vehicle container which comprises:
   a flexible sheet;
   a pair of cables secured at opposite end portions thereof to said vehicle within said container to as to provide a pair of taut lengths of cable;
   hooks mounted on said flexible sheet and adapted to mount on said cables for hanging said flexible sheet;
   a pair of clamps each received upon and slidable on a respective one of said cables, said clamps each including locking means which blocks movement of the clamp in one direction on its cable but permits movement in the opposite direction, said hooks each being attachable to a respective one of said clamps, said vehicle container being adapted to receive cargo, said clamps being arranged so that said locking means blocks movement of said flexible sheet away from said cargo;
   a further pair of cables secured at opposite end portions thereof to said vehicle within said container so as to provide a pair of taut lengths of cable, said first pair of cables being secured to the upper portion of said container and said further pair to the lower portion thereof;
   a pair of additional hooks mounted on said flexible sheet and each engaging a respective one of said further pair of cables, said flexible sheet having a generally rectangular configuration with each of said hooks being located at a respective one of the four corners of the rectangular configuration;
   each of said clamps comprising:
   an annular housing received on its respective cable and having an outwardly opening annular groove adapted to receive the respective hook;
   an annular ball guide received on said cable and within said annular housing, said ball guide having radially outwardly extending openings for the reception of balls;

balls received in the openings of said ball guide, said housing having a frusto-conical inwardly facing surface adapted to engage said balls and force them against said cable when said guide moves toward said frusto-conical surface;

spring means acting between said housing and said ball guide and urging said balls into wedged locking relation between said cable and said frusto-conical surface; and an elongated lever received on said ball guide and hanging downwardly therefrom and movable between said housing and said ball guide to pull said ball guide away from said frusto-conical surface and out of wedging relation between said cable and frusto-conical surface.

3. A cargo control restraint shield for use in a vehicle container which comprises:

a flexible sheet;

a pair of cables secured at opposite end portions thereof to said vehicle within said container so as to provide a pair of taut lengths of cable;

a pair of clamps each received upon and slidable on a respective one of said cables, said clamps each including locking means which blocks movement of the clamp in one direction on its cable but permits movement in the opposite direction;

hooks mounted on said flexible sheet, said hooks each being attachable to a respective one of said clamps, said vehicle container being adapted to receive cargo, said clamps being arranged so that said locking means blocks movement of said flexible sheet away from said cargo;

said hooks being detachable from said clamps and connectable to said cables for hanging said flexible sheet out of the way;

a further pair of cables secured at opposite end portions thereof to said vehicle within said container so as to provide a pair of taut lengths of cable, said first pair of cables being secured to the upper portion of said container and said further pair to the lower portion thereof;

a pair of additional hooks mounted on said flexible sheet and each engaging a respective one of said further pair of cables, said flexible sheet having a generally rectangular configuration with each of said hooks being located at a respective one of the four corners of the rectangular configuration;

further hooks mounted on said flexible sheet in overlapping relation to said first mentioned hooks and extending in an opposite direction to said first mentioned hooks;

each of said further hooks being fixed and spaced relative to a respective one of said mentioned hooks.

* * * * *

UNITED STATES PATENT AND TRADEMARK OFFICE
CERTIFICATE OF CORRECTION

PATENT NO. : 4,096,807
DATED : June 27, 1978
INVENTOR(S) : Ernest F. Woodward

It is certified that error appears in the above-identified patent and that said Letters Patent are hereby corrected as shown below:

In column 6, line 36, after the word "container" please delete the word "to" and replace it with the word --so--.

Signed and Sealed this

Second Day of January 1979

[SEAL]

Attest:

RUTH C. MASON
*Attesting Officer*

DONALD W. BANNER
*Commissioner of Patents and Trademarks*